Patented Apr. 1, 1941

2,237,219

UNITED STATES PATENT OFFICE 2,237,219

APPLICATION OF CELLULOSE DERIVATIVES

Vincent Jerome Flynn, Brooklyn, N. Y., assignor to Wardlyn Corporation, Union City, N. J., a corporation of New Jersey No Drawing. Application September 29, 1938, Serial No. 232,407

8 Claims. (Cl. 128—349)

This invention relates to compositions of tubes of varying size, shape and length partially or wholly composed of organic derivatives, either solid or hollow, or circular, oval, elliptical, square, rectangular or of other cross-sectional shape, and in general, to surgical devices comprehended under the terms exploratory and evacuative, as catheters, sounds or cannulae, being when solid, intended for distending a passage, and when hollow for insertion into a normal opening of the body for injection or withdrawal of fluids therein or therefrom and for medicamentation, or for insertion into an incision as in post-operative work, for drainage and other purposes.

By the term "catheter" as herein applied, is to be understood as comprehending the various sizes, shapes and lengths of (usually) hollow construction for introduction of a substance into the body through an opening or the withdrawal of fluids therefrom, and referred to under terms such as antrum, colonic, elbowed, double-elbowed, curved, eustachian, faucial, female, in-dwelling, prostatic, or winged catheters, tubes, irrigators, and by other names.

Heretofore, catheters have been made of various materials showing a degree of flexibility, as thin metal tubing, rubber of varying stages of vulcanization, and compounds in the liquid or semi-liquid condition built up over a web as of a fabric, usually by repeated dipping of the same in a solution of the coating or impregnating material.

Metal catheters are harsh to delicate membranes, prone to irritate and wound tissues upon insertion, especially when the tissues are ultra-sensitive and unusually delicate, as in inflammatory and certain pathological processes and normal and pathologic secretions exert a solvent effect on the metal which with some metals is very marked. Their comparatively low elasticity is also a disadvantage to their extensive application, especially in urological work such as urethral, ureteral and renal exploration and in connection with the removal of some forms of renal calculi.

Catheters made of rubber vary greatly in elasticity and suppleness dependent upon the degree of vulcanization to which the rubber has been subjected. The "soft" rubber catheters are highly elastic, but more or less porous and spongy, causing difficulty in sterilization, and requiring such rigid sterilization treatments as to materially shorten their period of effectiveness. They also, in general, lack the requisite rigidity coupled with the desired flexibility to penetrate body canals, especially the ureter where the canal diameter is relatively small and more or less tortuous, and which may be constricted or even substantially closed by means of abnormal or other conditions present therein.

The "hard" rubber catheters while they may be of the desired rigidity, are deficient in suppleness and pliability. The comparatively large amounts of sulfur and sulfur compounds contained therein, together with the vulcanization accelerators, many of which are nitrogen compounds of pronounced toxicity, materially militate against their effectiveness and narrow their range of safe applicability. Furthermore, hard rubber catheters are prone to injure and wound delicate membranes which are often extremely tender and susceptible due to irritations and inflammatory conditions so that the use of these catheters is materially limited, both as to scope of application and to the technique and experience of the manipulator. Catheters are often used by the layman, sometimes daily, as in prostatic enlargement and analogous complications, and the unyielding property of vulcanized rubber often initiates irritation, which, when continued, may and does lead to serious chronic results.

Glass catheters, while usually of smooth surface, have a very low elasticity and suppleness, and there is always present the grave danger of breakage or chipping off, especially where the glass wall is of relatively extreme thinness, as is sometimes the case. For this and other reasons, the use of glass catheters involves an element of danger, and in addition they have a limited and decreasing range of applicability.

Enamel catheters, that is, catheters made of glazed porcelain, are used to a limited extent. They are practically rigid with zero flexibility, of relatively rough interior due to the difficulties of interior glazing, and very fragile in the thin cell wall diameter as usually prepared. By virtue of this inherent rigidity enamel catheters are useless for adaptation to the varying contour of the canal into which they are intended to be inserted, and the rough interior introduces the danger of incomplete sterilization.

One of the objects of my invention is to overcome and minimize the herein enumerated and other disadvantages, while still conserving the points of desirability of these instruments as a class, as applied to the various uses for which they are normally intended, and I have found that most of the inherent objections are overcome where the catheter material is composed of an etherized cellulose, especially where the degree of etherification approaches the maximum.

By etherized cellulose as herein used, is to be understood commercially alkylated, arylated or aralkylated normal or modified cellulose, as highly etherified methyl-, ethyl-, propyl-, butyl-, or benzyl-cellulose, or mixtures of the same as examples.

For many purposes and depending upon the physical properties desired in the finished catheter, and its size, dimensions, wall thickness, etc., the desired elasticity, suppleness, flexibility, stability, and freedom from objectionable features for the purposes for which it is intended, I may use a single or a mixed cellulose ether or mixture of cellulose ethers, and where additional suppleness, elasticity, etc., is desired, suitable plasticizers, flexilizers softeners, extensifiers or suppleness-inducing components may be incorporated with the cellulose ether in an amount and of a nature to impart the kind and degree of characteristics desired. The highly etherified ethylcelluloses and benzyl-celluloses have been found especially useful in this connection, on account of the number and amount of suitable plastifying components which may be harmoniously incorporated therewith to induce the specific properties required and the extent of the same desired.

The cellulose ethers, as a class, are insoluble in, and not detrimentally affected by ptyalin, pepsin, trypsin, oleopsin, steapsin, and other body enzymes and fluids, the products elaborated in the gall bladder, liver and kidney, both those that are normal to the healthy body and those formed under pathological conditions; they can be produced of a high degree of flexibility, and are not adversely affected by the usual antiseptics, disinfectants, bactericides, both those of metallic and non-metallic origin, usually applied for sterilization purposes.

As is well known, many of the normal or pathological body secretions either are distinctly acid in reaction as the hydrochloric acid in the gastric juice, the bile acids, uric acid and the like, while other secretions are of pronounced alkaline reaction. These chemically reactive bodies often aided by enzymic action, exert an appreciable dissolving and decomposing effect upon a catheter or instrument of analogous use, when made of rubber or a cellulose ester, especially where in some instances, the tubular surgical device is left in the body for an extended period as often is the case in drainage treatments. With the simple cellulose esters, as the nitrate or the acetate, a saponifying action results, whereby a decomposition of the cellulose ester takes place by a splitting off of acid radical.

As the culmination of a series of quantitative researches, the surprising and unobvious observation has been made, that cellulose ethers, and specifically the aralkylcelluloses of comparatively high degree of aralkylation, are substantially insoluble in and unaffected by chemical and other components elaborated by or in the human body in health and disease.

This has been found to hold true to the maximum degree when benzyl cellulose is the aralkylcellulose employed, and where the benzylation has been allowed to proceed to commercially maximum etherification, that is to say, where benzylation of the cellulose has resulted in the introduction of benzyl or benzoxy rests to the extent of 75% to 95% of that theoretically possible, with the production of a cellulose ether substantially insoluble in water. The word "maximum" as herein used in connection with the etherification of cellulose or other carbohydrate, varies considerably in commercial processes, depending upon the nature of the etherifying process and the efficiency of the particular apparatus employed in the various etherifying steps.

The available benzylcelluloses of commerce, insofar as aware, are not of maximum commercial degrees of benzylation. They are so benzylated as to meet most of the technical requirements for which they are intended. To prepare a benzylated cellulose of maximum etherification, is a relatively expensive operation not justified by the usual requirements of this cellulose ether in the lacquer and plastic arts.

It is recognized that in general, the water insolubility, swelling in the presence of water or hydrous elements, and innocuousness to chemical reagents, gradually increases as additional benzyl groups or rests are introduced into the cellulose aggregate, but heretofore no quantitative work has been done in determining the swelling, relative solubility and innocuousness to normal and pathological fluids of benzylcelluloses approaching the maximum in degree of benzylation. In the use of a benzylcellulose instrument of the catheter type, and in drainage after operations and for other purposes, especially in renal surgery and treatment for renal calculi, it often becomes necessary to allow the instrument to remain for days and sometimes weeks in contact with highly sensitive membranes. In such conditions, it is paramount that there shall be substantially no swelling of the catheter substance by the normal and pathological fluids in which it is continually in contact.

Ordinary and so-called commercial tribenzylcelluloses are not suitable for this purpose on account of the intumescing or solubilizing action of the acid and alkaline body contents with which they are placed in contact in normal use. This limitation of their use in this important field wherein heretofore they have been found unsatisfactory, has been overcome by me, by either benzylating cellulose with a theoretical excess of benzylating agent under optimum conditions, or re-benzylating the usual commercial benzylcelluloses to substantially maximum degree of benzylation.

Another valuable discovery made by me is that where the substantially maximum amount of benzyl is combined with cellulose, thermoplasticizing bodies may be used wherein the softening point of the surgical instrument or catheter made therefrom, can be reduced to around the temperature of the human body. This advantage lies in the fact that the rigidity of the catheter or similar instrument may be modified by insertion in the body, so that exploratory work, especially in connection with renal treatment and examinations may be made, which would be impossible with such rigid, non-thermoplastic bodies, for example, as rubber. This knowledge is unobvious and only discovered by a combination of laboratory investigation and clinical use.

The cellulose ethers as a body are characterized by relatively great stability and apathy to reaction with chemical reagents, while still conserving an unusually high degree of inherent flexibility. The cellulose ethers may be treated with lye solutions of high concentration with impunity, since there is no acid radical to saponify off by alkaline treatment as is the case with the simple cellulose esters, and in addition are inert to many chemicals which injuriously affect rubber and other materials of which catheters of the present art are made. It is impossible to increase the elasticity of rubber at will by the addition of products thereto, whereas with the cellulose ethers, by selection of the appropriate plastifying agent or combination of the same, and the ratio between plastifier and cellulose ether, there is a very wide range of flexibility and elasticity possible, which peculiarly adapts the cellulose ethers for use in the catheter industry. Phenols, iodides and other halogen inorganic or organic compounds of normal bactericidal concentration are inert in unfavorable action to the cellulose ethers of degree of etherification comprehended herein.

The antiseptic, local anesthetic, fungicide, bactericide, medicament, or other addition of therapeutic value to the catheter substance may be incorporated therewith in any approved manner, such, for instance, as dissolving the same in a relatively small amount of harmonious solvent or solvent combination, incorporating the same with the etherized cellulose in any approved manner as by malaxation, then preferably removing the volatile portion by an evaporative step before extrusion, so that the medicament is uniformly disseminated throughout the etherized cellulose mass.

The etherized celluloses as a class are peculiarly adapted for use in this connection by virtue of the fact that they may be extruded in practically non-porous condition, may be dyed, pigmented, or otherwise treated without detrimentally affecting their normal stability or usefulness; and the elasticity, being inherent in the cellulose ether body, persists unchanged for an indefinite period of time. Therefore, a widely varying degree of desirable properties may be obtained, especially as to elasticity, plasticity, suppleness and flexibility of the ether, and these inherent desirable properties may be considerably enhanced by the addition to the cellulose ethers of suitable plasticizing bodies now known to the cellulose ether art, such as aliphatic and carbocyclic esters of lactic, glycollic, tartaric, phthalic and other acids, aryl phosphates, cyclohexanol esters, synthetic resinous bodies such as the halogenated diphenyls, the substituted sulfonamides, and the like.

A catheter, in general, may be considered as a tube, straight, curved, elbowed, etc., depending upon the use for which it is normally intended, and usually comprises an outer end or end held by the operator, which may be of the same exterior diameter as the remainder of the tube portion or may be flared or otherwise enlarged; the opposite end called the tip or beak, being that end intended for insertion, and which may be of the same diameter as the tube portion, or may be smaller, and is usually made in many shapes and in a variety of ways. The tip may be a portion of the original tube with one or more orifices therein, or it may be a separate piece immovably attached to the body of the catheter tube by means of an agglutinant, by fusion, or in any other manner. The shape, configuration, length, and number of orifices therein, may vary considerably, depending upon the specific use to which the instrument is to be applied.

Having determined the degree of ether properties intended from the desired use for which the instrument is designed, the kind and nature of cellulose ether is selected, the amount and kind of thermoplasticizing body added if any be used, and the composition by means of solvents, nonsolvents and solvent and non-solvent combinations, is gelatinized or colloided to the degree required, and is then extruded through an orifice of appropriate size and shape, into tubular or other form.

In general, it has been found the melting point is raised and the deleterious action of water on the cellulose ether decreases with the number of similar or dissimilar radicals in the etherized cellulose. For the above and other reasons, I have obtained most satisfactory results herein by employing a cellulose ether or cellulose ethers approaching substantially as nearly as commercially feasible, the maximum degree in etherification.

The exterior surface of the material may be modified as by smoothing, dipping in a cellulose ester, cellulose ether, or other lacquer or coating composition, to increase the hardness, lessen the degree of permeability or for other reasons, after which the tube portion is expanded or the diameter otherwise modified at the outer end, and the tip or beak portion may be punched, drilled, or otherwise one or more orifices placed therein after closing the beak end, as with a cellulose ether composition, or a separate tip may be made and coapted onto the tube portion by means of an adhesive, by heat, by heat and pressure, or in any other way, said tip being of the size and nature required for the specific purpose intended. The number, size, spacing and location of orifices in the beak portion may be modified at will.

The cellulose ether composition may be colored, with dye or pigment or both, to render the instrument distinctive upon observation; it may be printed or lithographed upon, either under or on the final exterior coat if the extruded member is subjected to a dipping process after extrusion, or various antiseptics, remedial agents, analgesics or local anesthetics may be incorporated in the cellulose ether plastic mass to induce a therapeutic effect on the organs with which the catheter may normally be brought into contact. Urethral and especially ureteral catheter explorations are usually relatively painful operations, so that the incorporation within the catheter mass of local anesthetics, analgesics and the like, is often indicated.

Before extrusion into tubular form, and especially where the instrument is intended primarily for urological work as with urethral and ureteral catheters, the cellulose ether may have incorporated therewith and therein, varying proportions of opacity inducing bodies of value in X-ray work, such as bismuth salts (the normal nitrate or subnitrate), lead sulfates and lead salts, barium salts such as barium sulfate or barium titanate and other salts or mixtures of salts suitable for this purpose. As an example, given for illustrative purposes only, I have found an excellent composition for this purpose to be composed of 100 parts cellulose ether plastic mass to about 100 to 150 parts lead sulfate, although these proportions may be varied from the amounts above stated, depending upon the cellulose ether composition, the dimensions and thickness of the catheter tube, the nature of the opacity-inducing body used, and the particular roentgenological diagnosis to be made.

Urethral catheters are usually flared on the outer end, substantially round, of exterior diameter 0.06 to 0.25 inch, interior diameter sufficiently large usually to admit a ureteral catheter. Ureteral catheters are usually not flared on the outer end, and varying tube diameter from 0.04 to 0.10 inch external and about 0.015 inch internal diameters. For colonic work, a round tip is usually used, the exterior diameter being up to 0.75 inch diameter. An antrum catheter usually has an exterior diameter range of 0.075 to 0.15 inch and a varying internal diameter. The exterior and interior diameters will, of course, be adjusted by the extrusion operation, taking into the consideration the amount, if any, of volatile solvent present and the relative volatility of the plasticizing portion added to the cellulose ether prior to the extrusion operation. The shape of the catheter tip may vary considerably, as in the olive, round or whistle tips, as examples.

In general, the substantially maximum benzylated celluloses have a relatively high inherent thermoplasticity, which property may be considerably augmented and varied in degree by the incorporation therewith of suitable known cellulose ether plasticizers and flexibility-inducing compounds, and still conserve the relatively high and permanent stability to, and insolubility in chemical reagents which characterize the cellulose ethers in general.

Likewise, it has been found that by the use of certain cellulose ether plasticizing and thermoplasticizing agents, the stability of the etherized cellulose may be augmented, the porosity diminished, and the suppleness and flexibility materially increased, without concomitantly decreasing otherwise valuable inherent characteristics.

There has been described a method of producing a catheter by first forming a textile core, dipping the core into a solution of cellulose or other compound, drying the same, then repeating the process until there has been built up on the textile center or core a sufficient thickness of layers for the purposes intended. However, such constructed tubes are porous, they have pinholes and blisters therein which increase the natural porosity, as compared with the cellulose ether composition of the nature as herein set forth which has been compacted by the necessarily high pressure involved in the extrusion operation to a unitary non-porous whole, and is composed of a unitary material throughout its substance. With a fabric core catheter built up in the manner as above indicated, there is tendency upon use for the textile core to become frayed, and a fragment may be broken off and remain in the bladder or kidney, thus providing a nucleus or nidus around which a calculus may form.

Therefore, the catheter involved in this invention is of homogeneous structure throughout, and there is no dissimilar material core which may break off, fray or cause an impediment in X-ray work or similar investigation, on account of variation of opacity.

At the close of the extrusion operation, the catheter may be dipped, sprayed, or otherwise coated with a cellulose compound in solution, and the instrument may be smoothed, polished, printed upon or otherwise treated to produce a finished appearing instrument. The printing operation may be conducted upon the extruded cellulose compound, either before or after the catheter is coated with a fluid compound, and either before or after the polishing or other finishing operation.

What I claim is:

1. A tubular surgical device comprising a plasticized etherized cellulose, of commercially maximum degree of etherification.

2. A smooth tubular surgical device comprising a plasticized etherized cellulose of maximum degree of etherification.

3. A tubular surgical device comprising an aralkylated cellulose, of maximum commercial degree of aralkylation.

4. A smooth flexible, tubular surgical device of homogeneous structure, said device comprising a thermoplastic aralkylated cellulose, of maximum commercial degree of aralkylation.

5. A catheter comprising a benzylcellulose, of commercially maximum degree of benzylation.

6. A catheter comprising a thermoplasticized benzylated cellulose of commercially maximum degree of benzylation.

7. A catheter comprising a thermoplastic, smooth, water-insoluble benzylated cellulose of commercially maximum degree of etherification, not adversely affected by the normal or pathological fluids of the body.

8. A catheter comprising a relatively long, hollow tube of small external diameter formed by extrusion from a thermoplastic mass of plasticized etherized cellulose so as to be externally smooth, continuous, non-porous and highly flexible but having sufficient inherent tensile strength and longitudinal rigidity to permit insertion by itself into and through long, narrow and tortuous bodily passages, the degree of etherification of said mass being so high as to render said catheter water-insoluble and unaffected by moisture, substantially inert to bodily fluids and medicaments and to have the other inherent characteristics aforesaid.

VINCENT JEROME FLYNN.